US012744023B2

(12) United States Patent
Kwitek et al.

(10) Patent No.: US 12,744,023 B2
(45) Date of Patent: Sep. 22, 2026

(54) SOUND CANCELLATION DEVICE FOR A COMPUTER BASED CALLING DEVICE

(71) Applicants: Benjamin J Kwitek, Colorado Springs, CO (US); Scott C Harris, Rancho Santa Fe, CA (US)

(72) Inventors: Benjamin J Kwitek, Colorado Springs, CO (US); Scott C Harris, Rancho Santa Fe, CA (US)

( * ) Notice: Subject to any disclaimer, the term of this patent is extended or adjusted under 35 U.S.C. 154(b) by 0 days.

(21) Appl. No.: 19/035,339

(22) Filed: Jan. 23, 2025

(65) Prior Publication Data

US 2026/0212854 A1 Jul. 23, 2026

(51) Int. Cl.
*G10K 11/178* (2006.01)

(52) U.S. Cl.
CPC .................................. *G10K 11/178* (2013.01)

(58) Field of Classification Search
CPC .................................................... G10K 11/178
USPC .......................................................... 381/71.1
See application file for complete search history.

(56) References Cited

U.S. PATENT DOCUMENTS 11,234,073 B1 * 1/2022 Xu ................... G10K 11/17857
2015/0195641 A1 * 7/2015 Di Censo ............. H04R 1/1083
381/71.6

* cited by examiner

*Primary Examiner* — Carolyn R Edwards
*Assistant Examiner* — Friedrich Fahnert
(74) *Attorney, Agent, or Firm* — Scott C Harris, Esq.

(57) ABSTRACT

An undesired sound reduction system which reduces sounds received into a microphone during the call. Undesired sounds are identified, and samples of the undesired sounds are created. The undesired sounds can be identified by using known sounds of public places, by manufacturers, or by a user indicating that the sound is undesirable at one time to use that indication at some later time. When the undesired sounds are identified during the call, a part of the undesired sound is reduced in volume or prominence more than other parts of the call, to thus reduce the undesired sound.

18 Claims, 3 Drawing Sheets

SOUND CANCELLATION DEVICE FOR A COMPUTER BASED CALLING DEVICE

BACKGROUND

Modern work environment include numerous calls with coworkers, suppliers, business partners, customers and other stakeholders. Today, many of these calls utilize voice and video. Videoconferencing products/services such as Microsoft Teams, Zoom, Webex and others are frequently used. They allow remote workers to collaborate more effectively-almost as if they were together in a physical location such as an office or factory.

The work-from-home trend and hybrid work schedules have increased the reliance on videoconferencing. It is common to have people take meetings from their home offices, living rooms, bedrooms or even outside of their homes. While traveling, workers often make calls from hotels, airports, train stations, restaurants, conference centers, libraries and coffee shops. All these places have unwanted background noises that can interfere with the quality of work during a call.

Whether taking the call from home, the office, or on-the-go, technological features can dominate the experience. These technologies exist on smartphones, tablets, watches, laptops and desktop computers. Many call processing systems use a camera that captures the image of the caller and presents it on the screen for the other participants to see. Speakers on the device can provide the audio. A microphone can receive the sound to be added to the conversation, capturing the voice of the caller so that the other participants can hear.

Callers have some control over all three of these technologies.

Regarding cameras, they can be turned off. They can also be covered with an opaque material or add-on device to provide complete privacy. The camera's effects can also be adapted to blur the background of the participant or superimpose a desired background (oftentimes a vacation destination or cityscape) behind the caller's body.

When the camera is on, participants know that they must monitor the area around them to prevent distractions. These distractions can be everything from family members to pets to cars traveling on the nearby roads.

Regarding speakers, the caller has the option to control the incoming sound. It can be turned up, down, or off completely. Sometimes users may need to increase or decrease the volume based on the participant and the strength of his or her voice.

The microphone of the smartphone can be muted but this will mute all sound coming out of the speakers of the other participants. In other words, muting the microphone eliminates the caller's ability to speak during the call.

SUMMARY OF THE INVENTION

The inventors have recognized, however, that the caller has limited control over the microphone on most devices. Microphones are either on or off. Presently, there are no ways to adjust the sensitivity of the microphone on smartphones, tablets, laptops and other computers.

When someone has their microphone muted, this is the off position. Frequently, people mute their microphone during calls to prevent unwanted sounds from disturbing the call. These can include many things that are distracting. Examples might include other people in the background, screaming children, barking dogs, traffic noises, emergency responder sirens, announcements from PA systems, flight attendant commands, HVAC systems, phones ringing, home automation sounds, security system chimes, and email alerts.

A problem is that when the caller is talking or presenting, the caller must have their microphone in the "on" position. This allows for the caller to be heard but also allows for unwanted background sounds to be picked up and broadcast to everyone on the call.

Another problem is that when the microphone is muted, the user often forgets and might try to talk, but nobody can hear them.

Therefore, the inventors recognize a real need for selective muting that is smart and capable of improving call quality and call participant satisfaction.

The present invention provides for the methods and systems to reduce or eliminate this problem.

An embodiment describes training the system to selectively mute unwanted sounds during a call.

An embodiment describes a system that provides information about sounds that would be undesired to occur during a call, and uses that knowledge to mute or reduce the volume of those sounds when they play while the user is on a call.

Embodiments describe a way for the caller to mark or classify unwanted sounds during calls. In one embodiment, the user enters these sounds into the software by playing them so that the computer could remember or mark them in real-time. Later, when these sounds occur within a call or a call environment, they would be muted or reduced in volume or prominence. In another embodiment, the device would utilize Artificial Intelligence (AI) to classify unwanted sounds. In yet another embodiment, the caller's voice would be analyzed and only those sounds consistent with the tone, resonance, intensity, duration, pitch and other factors would be broadcast to the other participants.

BRIEF DESCRIPTION OF THE DRAWINGS

In the Drawings.

the figure shows aspects of the invention, and specifically.

DETAILED DESCRIPTION

Throughout this application, a call or calls may refer to communications that include traditional voice calls, voice and video calls as well as voice, video and screensharing calls. These calls may be achieved using phones, smartphones, tablets, laptops, desktop computers, watches, and other computer-based devices.

In an exemplary embodiment, a person is sharing a PowerPoint presentation and explaining it in Microsoft Teams. The person often has an email program, such as Outlook, open during the presentation. Outlook provides chimes when incoming emails are received. These chimes are broadcast out from the device speakers and would be immediately picked up by the microphone so that everyone on the call would hear them. This can be embarrassing or distracting, especially with a VIP audience or a large audience, such as a class of students or conference presentation.

The caller has no good solution since the caller cannot turn down or off their speakers or mute themselves. The user needs the speakers and microphone to be active during the presentation.

The present application describes a system for using a computer-based system for selectively muting or reducing the volume of incoming sounds that match to certain identified and undesired sounds.

Figure 1:
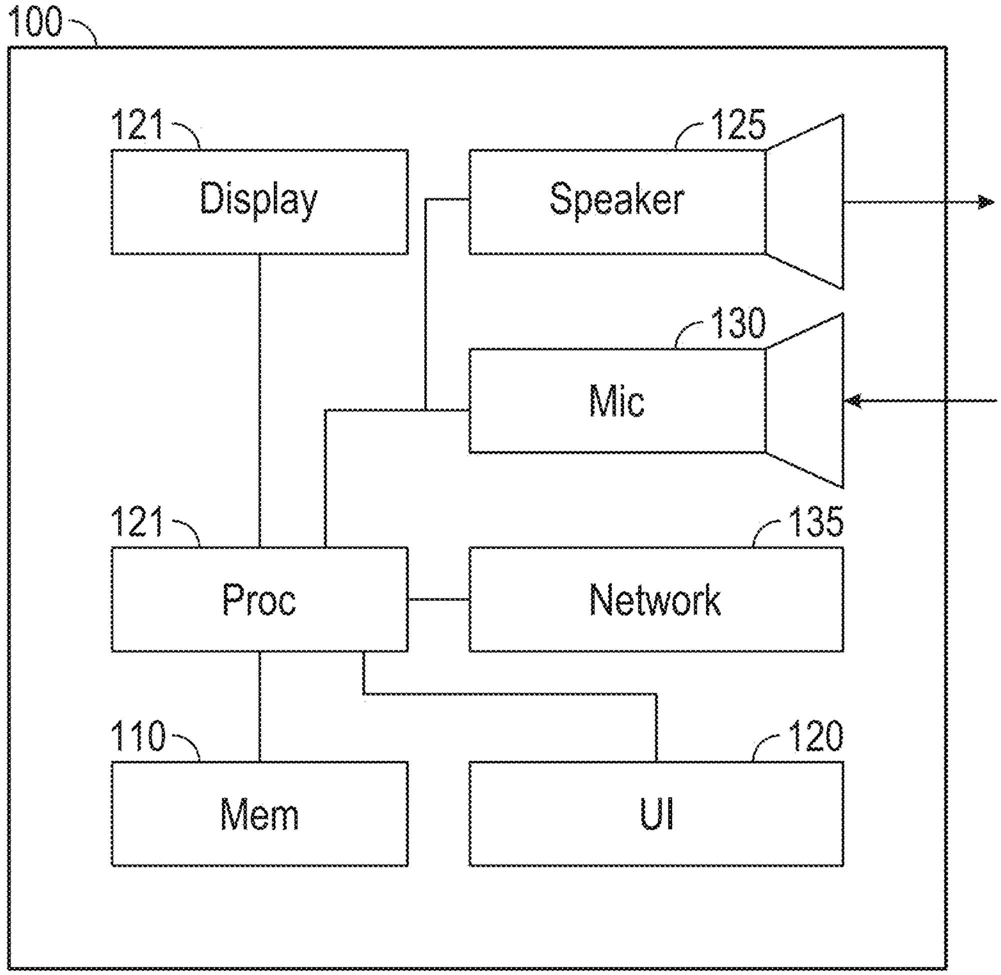
FIG. 1 shows a block diagram of a system.

FIG. 1 shows a block diagram of a personal communication device such as 100. The phone has a processor 105 which can be a special-purpose processor, running a program stored in memory 110. There is also a user interface 120, a speaker 125 and a microphone 130. A display 121 may be part of the user interface. A network connection 135 can be a connection to Wi-Fi or to a cellular network, or to any other form of data.

Figure 2:
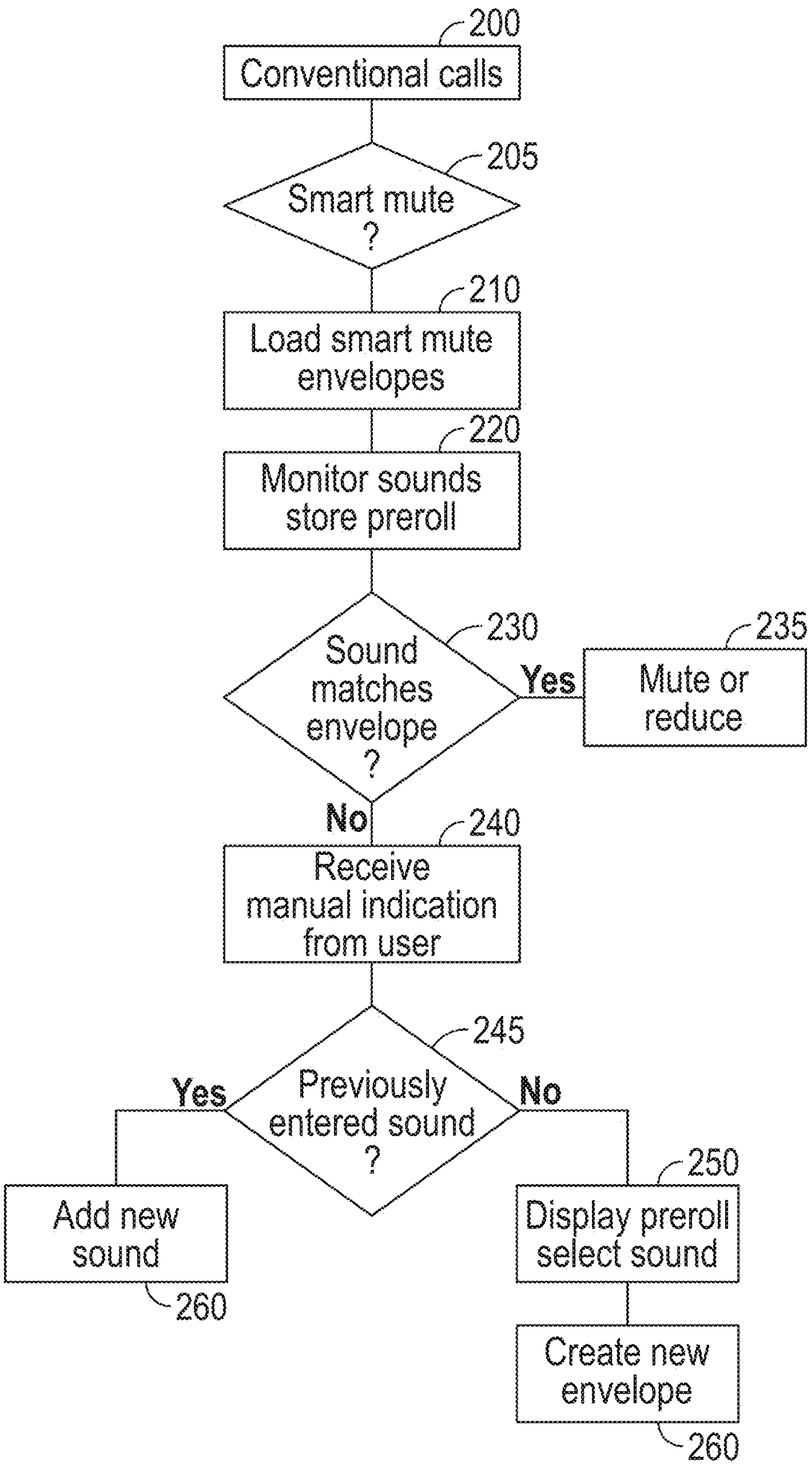
FIG. 2 shows an overall flowchart of operation.

The processor 105 controls the personal communication device, herein referred to as a phone, according to the flowchart of FIG. 2.

The processor can carry out controlling conventional calls and actions at 200.

At 205 the system detects that "smart mute" has been turned on, as described herein. In one embodiment, smart mute can be enabled as a default.

At 210, the system loads the previously stored smart mute envelopes. The smart mute envelopes are files that represent sounds which the user has previously indicated to the system are undesirable sounds to pass through from the microphone to the listener of the call. Examples of undesired sounds can include notification sounds from apps, sounds of doorbells, dogs barking, background sounds such as children screaming, public announcements, or other sounds that are not part of a user's desired call.

In one embodiment, the user selects sounds which are undesirable, while the undesirable sound is in existence, or later using a review process. The identified sounds are hereafter turned to "envelopes". The envelopes include electronic stored information indicative to the undesired sound. Incoming sounds are compared to the envelopes.

In another embodiment the system receives envelopes of undesired sounds.

In an embodiment, an AI learning function is used for finding sounds that are similar to the envelopes, e.g. public announcements may have different words in the announcements, but have a similar cadence to other marked envelopes. Sometimes, announcements in different places will have the same words as in other places. For example, announcements and airports will often announce that a user should not take any item on an airplane from someone that they do not know. This may be done in different voices, or different speeds, with similar words.

After loading the database of undesired sounds at 220, the system monitors the sounds that are coming from the microphone 130. These sounds are also stored to be used as a "pre-roll" so that they can be used for later marking of undesired sounds.

230 determines if the current sound matches to any previously stored envelope. If so, the part of the sound that matches to the envelope is reduced in volume or muted, while the desired part of the sound, is not reduced in volume, or at least not reduced in volume as much as the desired sound is reduced in volume.

The effect is that the part of the sound that matches to the envelope of the undesired sound, becomes less loud in the sound that passes through the microphone and eventually the speakers to the other recipient.

In an embodiment, this can be done by dividing the sounds from the microphone 130 into spectral bands of sound. This can be done mathematically, for example, using fast fourier transforms. One or more spectral band will represent the undesired sounds from the envelope. The spectral band of the sound that matches the envelope is reduced in volume.

In addition, or alternatively, a negative amplitude of the envelope can be added to the outgoing sound to even further mute the sound. The undesired sound can be digitally eliminated or reduced by adding a negative of the sound envelope to a digital representation of the sound.

In an embodiment, responsive to detecting that the sound from the microphone matches to the sound of an undesired sound, at least part of that undesired sound is removed from the microphone before it is sent to the listener, thereby reducing the undesired part of the sound coming from the microphone without muting the entire microphone and without reducing other parts of the sound coming from the microphone. This allows the user to still speak, but to have the part of the sound attributable to the undesired sound being reduced in volume.

If 230 indicates that a matching envelope is not received, then the flow continues, where 240 the user can press a specified indication on the display to indicate manually that an undesired sound has been playing. 245 gives the user a choice to indicate whether this was a previously marked sound.

If this was a new sound and not a previously entered sound, then at 250, the system plays the pre-roll and displays it as a sound wave on the screen. The user can select the moments of the pre-roll that represent the undesired sound. In one embodiment, the pre-roll may be divided spectrally. The user can playback each spectrum individually, and can select the spectrum of the sound that is being marked as being the undesired sound.

In another embodiment, the system can use its knowledge of what is likely to be an undesired sound to mark the part of the sound that is likely to be undesired, responsive to the user entering the indication that the sound is undesired at 240.

In another embodiment, the system can also use its knowledge of what is likely to be an undesired sound to attempt to find any previously entered sounds which match to the currently marked sound.

At 255, the selected sound then forms an envelope which is added to the other envelopes that are loaded at 210.

If 245 indicates that this is a previously entered sound, when the sound is added to the existing envelope at 260. The system can allow the undesired sounds to be matched to a number of different modifications of the undesired sound. For example, public address system announcements can have multiple different announcers who are announcing the sound and multiple different words in the public address announcement, or can have the same words in the public address announcement using different speakers.

In an embodiment, the system can also, using an AI type system, decide what kinds of sounds can be included within the envelope. In an embodiment, for example, different categories of sounds can be added such as public address announcements. The user can enter a specific public address announcement, and then keep adding additional announcements, which the system uses as a learning system to learn what other public address announcements sound like.

Figure 3:
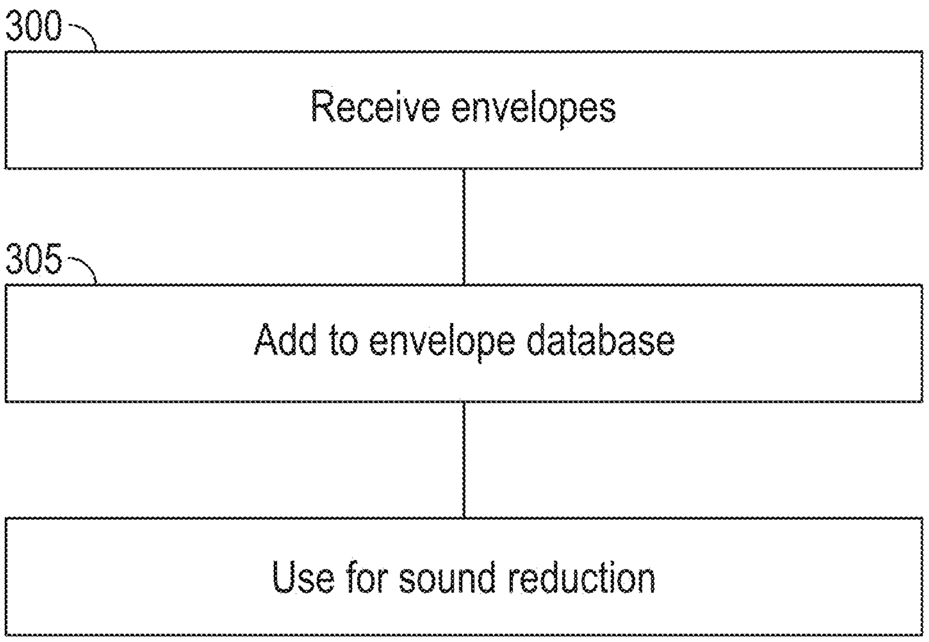
FIG. 3 shows a flowchart of operation of envelope detection to identify the unwanted sounds.

In an alternative embodiment, an undesired envelope is automatically characterized, to determine if it should be added to an existing envelope, or added as a new envelope FIG. 3 indicates another embodiment, which can be part of an installed program. Installed programs may include different kinds of sounds that are associated with those programs. For example, Outlook™ may provide a specific type of chime when a message is received. The phone itself may provide certain kinds of chimes when messages are received. Doorbells, such as the RING™ doorbell can provide envelopes of their ring tones.

At 300, the system receives envelopes for installed programs and purchased items. The envelopes can be received for example when the user installs the program or in purchases the item. One example can be the system exemplified above, for example the specific sounds used for Outlook can be included as part of the actual Outlook program, in one embodiment, for example, the program can have a function that says "add smart envelopes by selecting this", the smart mute envelopes that are part of the program can be automatically entered to the database of smart envelopes.

However, these envelopes can also be received for things other than programs which are installed. For example, different kinds of consumer devices may also have sounds. Refrigerators may have alarm sounds. Alarms may have alarm sounds. Smart doorbells may use sounds. Any of these can also come with either a hard wired version or the ability to download the envelope from the program or from the manufacturer.

In an embodiment, electronic appliances may include a QR code that is associated with actions to "scan this code to include the Ring™ doorbell sounds into your smart mute envelopes". By doing this, all of the different sounds associated with the appliance can be automatically entered into the smartphone as sounds to be masked. After receiving these envelopes from the manufacturer of the device, the envelopes are then added to the smart envelope database at 305.

In another embodiment, a sound reduction file 306 can also be added to the database along with the envelope. The sound reduction file 306 can be a file that is created by the manufacturer of the appliance, and intended to reduce the sound of the specific noises made by the appliance.

In embodiments, this can include doorbell sounds, door opening sounds, alarms such as items ready alarms, and all other sounds created by any appliance or any other sound creating device.

In, the envelopes that are received at 300 include sound envelopes for multiple different public places. For example, all of the different public address notifications for every airport in the United States may be received as part of these public places sounds. These envelopes can be added to the database in a similar way to reduce the sound that are similar to those public address announcements.

In embodiments, the system analyzes the presented sounds on multiple different levels. These include measuring the aspects of a sound wave-including wavelength, amplitude, frequency, time, and velocity. In addition, the properties of sound-pitch, dynamics, tone, color and duration are considered in classifying the sounds.

Using the previous example, one would register the sound of the incoming email chime. The software and system would then mute or reduce the sound of this chime whenever the caller is engaged in a call and has their microphone on (not muted).

The system forms a specialized version of noise-cancelling, for microphone. The system operates to target certain sound waves outside of the normal human voice sounds. These sounds could be muted in real-time by classifying the spectral range of the sound, and removing the amplitude at that spectral range before feeding the rest of the sound, without that spectral range removed, into the microphone.

In an alternative embodiment, this can be canceled or muted via opposite amplitude sound waves, or by digitally subtracting the sound before that sound is transmitted.

In another embodiment, the smart mute envelope database can be pre-populated with a database of common sounds that would generally be classified as unwanted. These might include automobile horns, loud car or truck engines, coffee machines, jet engines, train horns public address announcements, and other distracting sounds that routinely exist.

In addition to manually entering the unwanted sounds or background noise, the present system uses Artificial Intelligence (AI) and machine learning to automatically distinguish between good sound from the caller and unwanted or background sounds. The system would also create algorithms and rules for the classification and implementation of the selective mute function. Any time the user indicates that there is an undesired sound that matches to an already selected sound, the system learns from this action and modifies the smart mute envelope to include a wider definition of sounds.

In another embodiment, the system has a feedback interface for the user. He or she could rank the call quality and sound cancellation during or at the end of the session. The computer could then learn from this feedback to create smarter muting on future calls.

In another embodiment, the user can use the system to mute certain other people talking. For example if the user is in a room with other people such as the user's spouse or children, the user could mark the sounds of the spouse or children to be muted or reduced during the call. While human voices are generally desirable, this could be used to program automatically reduce sounds of other people during that call.

In another embodiment, this can be a control on the phone, requesting the phone to mute voices other than the user's voice. The phone knows the sound of the user's voice, and then can automatically mute other voices that are not the user's voice.

In another embodiment, the system shares information obtained with other users. This can be done to crowdsource the flags and rules from millions of users. The coding is shareable to the call facilitator (such as Microsoft or Zoom) so that they could refine and implement the solution on a broader scale.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A communicator system with a sound reduction system, comprising:

a communicator system, that controls carrying out calls with a remote party, the communicator system including a speaker that plays incoming sounds received from the remote party and a microphone that receives outgoing sounds to be sent to the remote party;

a processor, the controls the communicator system;

a memory, that stores information, including the memory storing at least one file of electronic stored information indicative of undesired sounds, where the undesired sounds are sounds that are undesirable to receive through the communicator microphone and to pass to the remote party;

the processor operating to compare incoming sounds from the microphone with the at least one file representing the undesired sounds, and the processor operating to reduce the volume of the undesired sounds in the incoming sounds before the incoming sounds are sent to the remote party, and the processor not reducing other parts of the incoming sounds as much as reducing the volume of the undesired sounds.

2. The system as in claim 1, wherein the processor determines a spectral frequency band of the undesired sound in the incoming sound, and reduces a volume of the spectral band in the undesired sound without reducing a volume of other spectral bands in the incoming sound.

3. The system as in claim 1, wherein the processor determines a negative of the undesired sound, and mathematically adds the negative of the undesired sound to the incoming sound from the microphone before sending sound from the microphone to the remote party.

4. The system as in claim 1, further comprising a user interface which enables a user to indicate when an incoming sound includes an undesired sound, and where the processor identifies the undesired sound, and creates a file indicative of the undesired sound that was identified, and where the file indicative of the undesired sound that was identified is added to the memory as one of the undesired sounds.

5. The system as in claim 4, wherein the memory stores a recording of sound received into the microphone, and the user interface controls the user playing back said recording, and to identifying a part of the recording that includes the undesired sound.

6. The system as in claim 1, wherein the processor controls receiving files indicative of undesired sounds from an external source, and storing information indicative of said files indicative of undesired sounds in said memory as one of said undesired sounds.

7. The system as in claim 6, wherein the files indicative of undesired sounds are indicative of appliances that create sounds, and are created by an appliance manufacturer.

8. The system as in claim 6, wherein the electronic stored information indicative of undesired sounds include sounds from public places.

9. The communicator system as in claim 1, where the communicator system sends the outgoing sound to the remote party with the volume of the undesired sounds in the incoming sounds having their reduced in volume.

10. The method as in claim 9, further comprising sending the outgoing sound to the remote party with the volume of the undesired sounds in the incoming sounds having their reduced in volume.

11. A method of muting undesired calls sounds during a call, comprising:

carrying out a call with a remote party, using a microphone on a communicator to receive sound that is sent to the remote party;

storing, in a memory, a plurality of undesired sounds;

responsive to detecting that a sound from the microphone matches to a an undesired sound stored in the memory, reducing a part of the sound coming from the microphone that includes the undesired sound, and not reducing another part of the sound from the microphone that does not includes the undesired sound as much as the sound from from the microphone that includes the undesired sound; and sending the sound from the microphone to the remote party with the part of the sound that includes the undesired sound being reduced in volume.

12. The method as in claim 11, wherein the reducing comprises using a processor to determine a spectral frequency band of the undesired sound in an incoming sound from the microphone, and reduce a volume of the spectral band in the undesired sound without reducing a volume of other spectral bands in the incoming sound.

13. The system as in claim 11, wherein the reducing comprises using a processor to determine a negative of the undesired sound, and mathematically add the negative of the undesired sound to an incoming sound from the microphone before sending sound from the microphone to the remote party.

14. The method as in claim 11, further comprising displaying a user interface, and receiving an indication when an incoming sound includes an undesired sound, and identifying the undesired sound, and creating a file indicative of the undesired sound that was identified, and where the file indicative of the undesired sound that was identified is added to the memory as one of the undesired sounds.

15. The method as in claim 14, further comprising storing a recording of sound received into the microphone, and the user using the user interface to play back said recording, and identifying a part of the recording that includes the undesired sound.

16. The method as in claim 11, further comprising receiving files indicative of undesired sounds from an external source, and storing information indicative of said files indicative of undesired sounds in said memory as one of said undesired sounds.

17. The method as in claim 16 wherein the files indicative of undesired sounds are indicative of appliances that create sounds, and are created by an appliance manufacturer.

18. A method of operating a communicator system with a sound reduction system, comprising:

Controlling carrying out calls with a remote party, using communicator system including a speaker that plays incoming sounds received from the remote party and a microphone that receives outgoing sounds to be sent to the remote party;

storing at least one file of electronic stored information indicative of undesired sounds, where the undesired sounds are sounds that are undesirable to receive through the communicator microphone and to pass to the remote party;

comparing incoming sounds from the microphone with the at least one file representing the undesired sounds, and reducing a volume of the undesired sounds in the incoming sounds before the incoming sounds are sent to the remote party, and the processor not reducing other parts of the incoming sounds as much as reducing the volume of the undesired sounds.

* * * * *